(12) United States Patent
Prell et al.

(10) Patent No.: US 6,463,824 B1
(45) Date of Patent: Oct. 15, 2002

(54) RIGHT ANGLE ATTACHMENT FOR POWER HAND TOOL

(75) Inventors: Edward T. Prell, Chicago, IL (US); Wolfgang Hirschburger, Wilmette, IL (US); Allen M. Oles, Chicago, IL (US)

(73) Assignee: S-B Power Tool Company, Chicago, IL (US)

( * ) Notice: Subject to any disclaimer, the term of this patent is extended or adjusted under 35 U.S.C. 154(b) by 0 days.

(21) Appl. No.: 09/515,195

(22) Filed: Feb. 29, 2000

(51) Int. Cl.$^7$ ................................................. B25F 1/02
(52) U.S. Cl. ............................. 74/417; 74/63; 81/57.13; 81/57.29; 173/29
(58) Field of Search ........................... 74/416, 417, 63; 81/57.13, 57.26, 57.27, 57.29; 173/29, 164

(56) References Cited

U.S. PATENT DOCUMENTS

| | | | | |
|---|---|---|---|---|
| 3,614,419 A | * | 10/1952 | Shaff | 377/8 |
| 3,724,561 A | * | 4/1973 | Merrels | 74/15.2 |
| 4,260,381 A | * | 4/1981 | Eibofner et al. | 433/126 |
| 4,286,675 A | * | 9/1981 | Tuggle | 173/213 |
| 4,485,682 A | * | 12/1984 | Stoezel et al. | 81/467 |
| 4,748,872 A | * | 6/1988 | Brown | 81/57.26 |
| 4,913,007 A | * | 4/1990 | Reynolds | 81/57.29 |
| 5,052,496 A | * | 10/1991 | Albert et al. | 81/57.13 |
| 5,749,728 A | * | 5/1998 | Bailey | 433/125 |
| 5,863,159 A | * | 1/1999 | Lasko | 81/57.29 |

OTHER PUBLICATIONS

Robart Modeling Tools, ROB421 "Robart Right Angle Drive" Web page printout Jun. 3, 1999, www.robart.com/pages/MODTOOLS.htm.
Proxxon®—Long Neck Angle Milling/Drilling Unit WB 220/E Roger Konig & Jurgen Kraft GbR—Web page printout Jun. 3, 1999, www.sell–it–easy.de/proxxon/english/wb220.htm.

* cited by examiner

Primary Examiner—William C Joyce
(74) Attorney, Agent, or Firm—Greer, Burns & Crain, Ltd.

(57) ABSTRACT

A right angle attachment configured to be attached to a small electrically powered rotary hand tool of the type that is used in woodworking, hobby work and other work. Being small, lightweight, relatively vibration free and quiet in operation, the attachment is easily attached to a hand tool in a very short amount of time without the use of any special tools. The attachment has a flexible input shaft and an output shaft that are oriented at an angular orientation, such as approximately 90 degrees relative to one another so that the flexible shaft compensates for misalignment between the input shaft and the output shaft of the tool. In operation, the attachment is easily attached to the hand tool by merely removing the chuck that is a part of the original hand tool and attaching the chuck to the attachment output shaft, threadably engaging a driver nut on the rotary tool output shaft, engaging a mounting coupling assembly onto a threaded end of the rotary tool case, and fitting the attachment to the hand tool by merely sliding it into engagement and tightening the coupling assembly by hand.

16 Claims, 2 Drawing Sheets

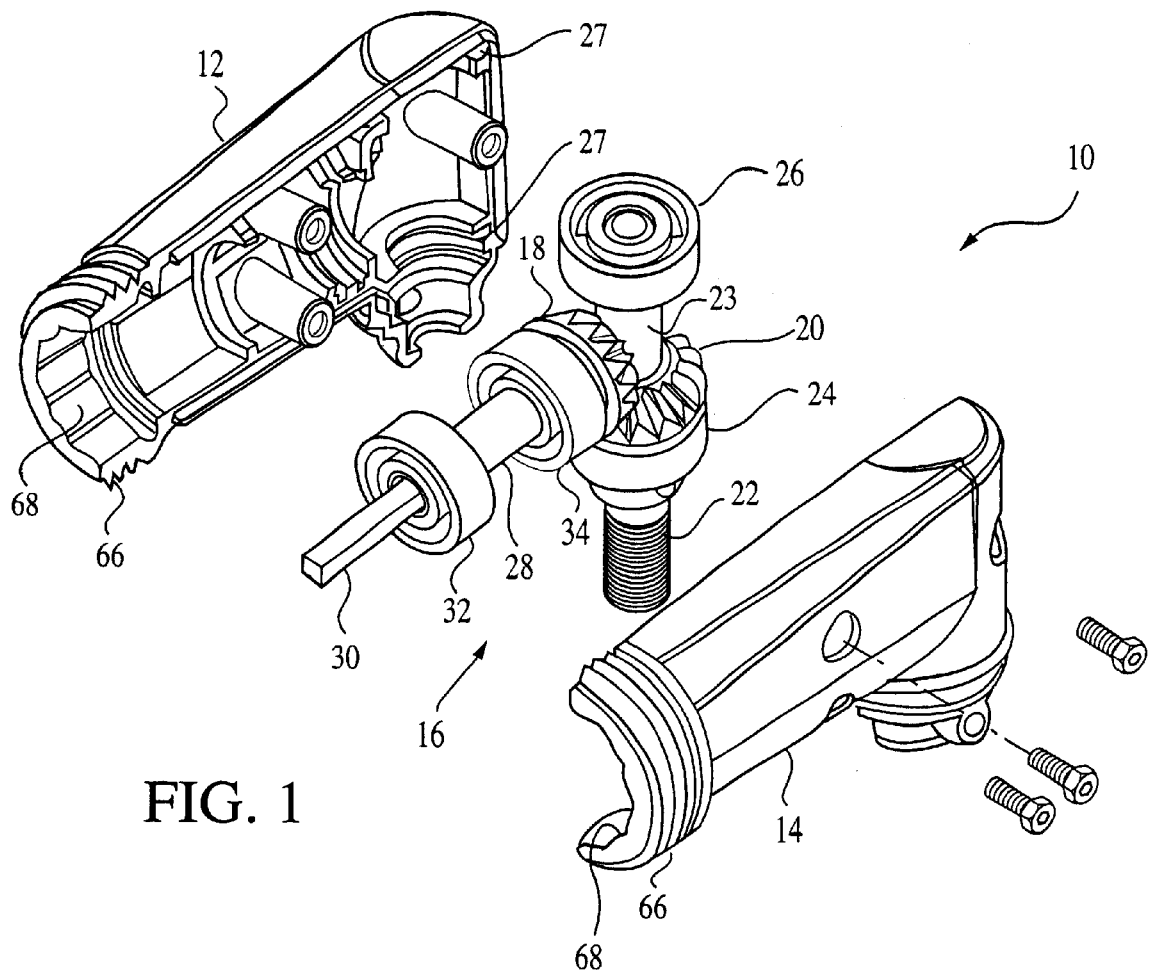
FIG. 1
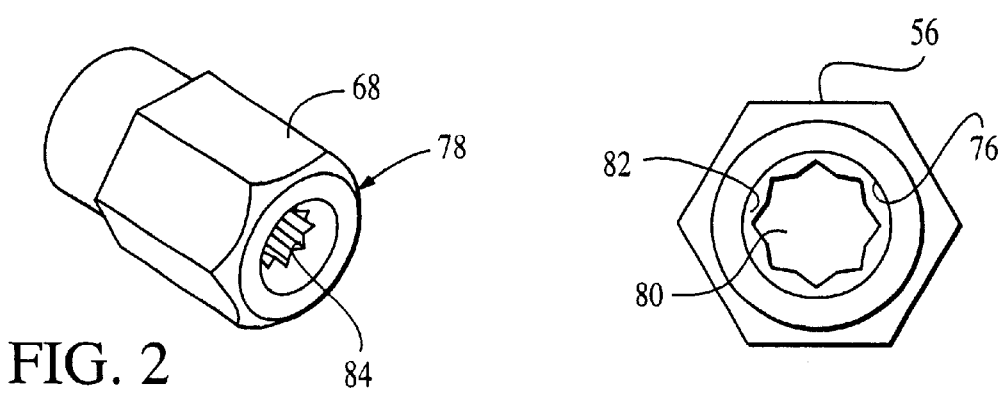
FIG. 2
FIG. 3

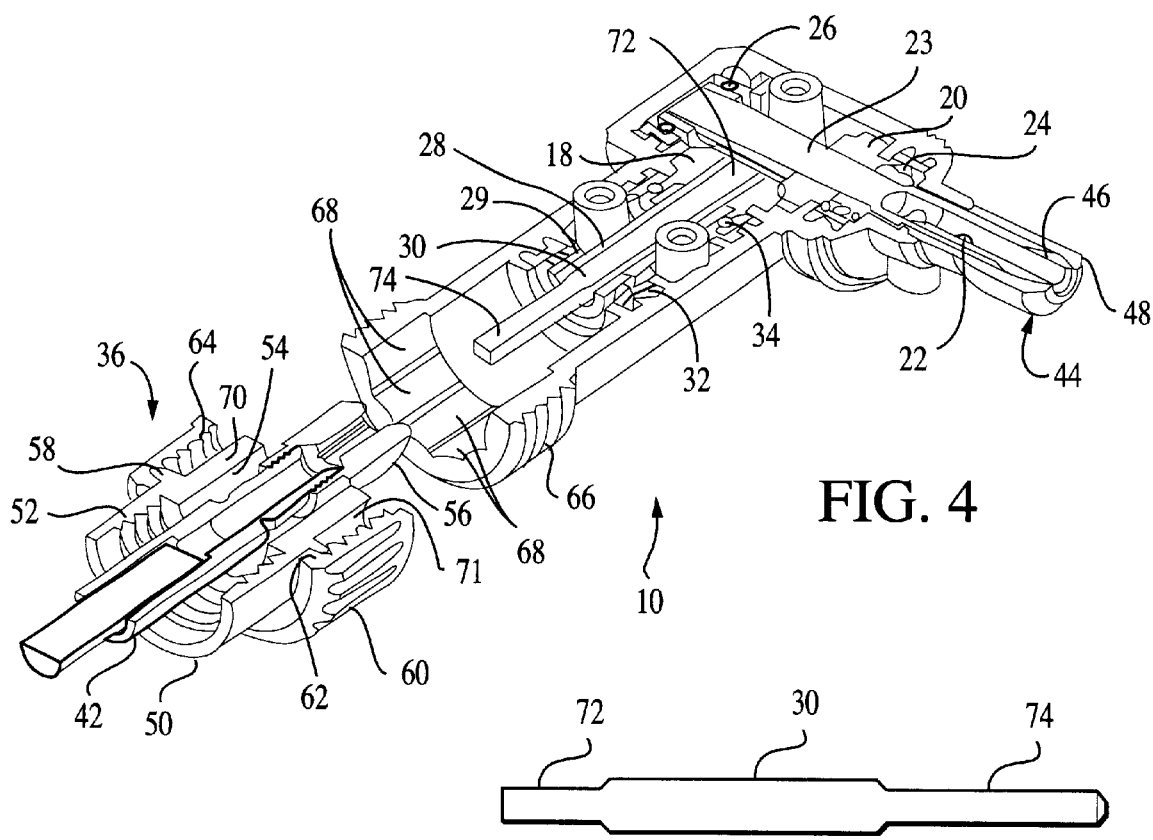
FIG. 4
FIG. 5
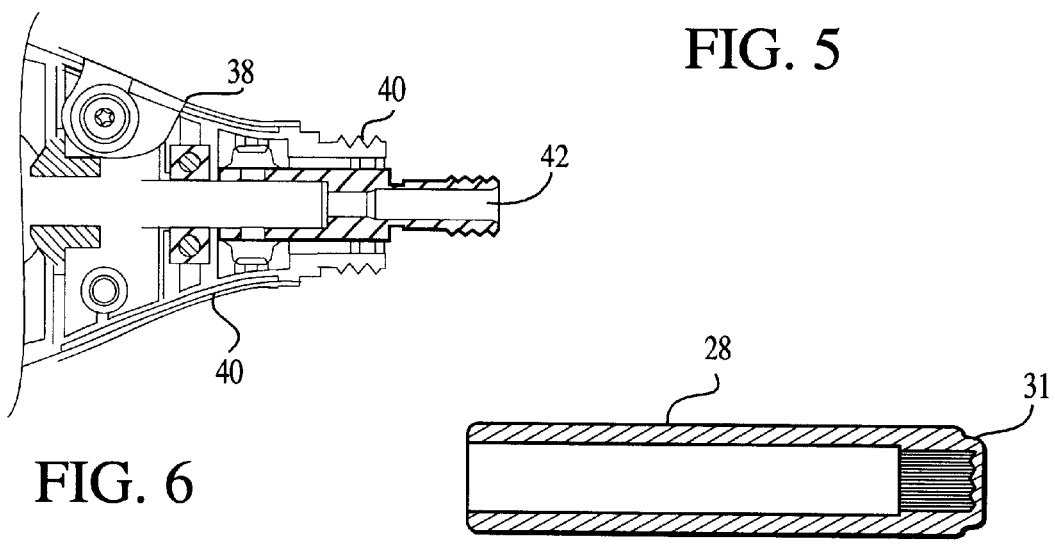
FIG. 6
FIG. 7

RIGHT ANGLE ATTACHMENT FOR POWER HAND TOOL

The present invention generally relates to power hand tools and more particularly to a right angle attachment for the same.

Small rotary hand tools have been marketed for many years for use in carrying out woodworking and metal working tasks by hobbyists as well as commercial artisans. Such small rotary hand tools generally have a motor unit with a rotary output shaft that is adapted to connect to a number of accessories, a common one of which is a very long sheathed cable to which a sanding implement or rotary cutting implement can be attached. This enables the user to use the implement without lifting the drive unit itself which is often sufficiently large that it will cause fatigue to the user and also may interfere with desirable and effective use of the implement in close quarters.

The drive unit of many recent models of such rotary hand tools is relatively small and lightweight which is capable of being easily used by a user. Such rotary hand tools may be smaller than many small flashlights, i.e., they may have a diameter less than about two inches and a length of only about six inches. The tool has a small but powerful electric motor that drives an output shaft at high speed, and a rotary implement can be typically attached to the tool's output shaft which is axially aligned with the tool. When the implement is attached directly to the output shaft, it is convenient for use in many applications, but it is also desirable for some applications that the orientation of the grinding or cutting implement be changed to a right angle relationship relative to the output shaft. In the present application, a "right" angle is intended to have a broader meaning than precisely 90°, and refers to orientations having the general appearance of a 90° angle.

For such usage, a right angle attachment may be convenient for users to get to hard to get at areas and provide greater maneuverability that enables the attached implement to be handled and controlled more easily. Right angle attachments may be highly desirable for doing such application work as grinding, polishing an engine cylinder, drilling in tight areas, repairing household parts, grinding and sanding metal and wood, in addition to model railroad and airplane building and repair work.

Such right angle attachments have been designed for attachment to some tools, but many of such attachments are cumbersome to connect to the power unit tool in that they require tools such as screwdrivers, wrenches and the like to do so. Moreover, such attachments often cannot be angularly adjusted relative to the rotary hand tool and also do not operate in a smooth and aesthetically pleasing manner, i.e., they exhibit displeasing vibration, may overheat and are noisy during operation.

Accordingly, it is a primary object of the present invention to provide an improved right angle attachment for use with small rotary hand tools which is easily attached to the tool without special tools.

Another object is to provide such an improved right angle attachment that offers smooth reliable operating characteristics, in that it does not overheat or exhibit excessive noise or vibration.

Still another object of the present invention is to provide such an improved right angle attachment that is adapted to use the original chuck of the rotary hand tool which can be removed from the tool itself and applied to the output shaft of the right angle attachment in a simple manner.

A more detailed object of the present invention lies in the provision for the improved right angle attachment being easily mounted to the hand tool by simply removing the chuck from the hand tool, screwing a mounting coupling assembly onto the rotary tool housing, screwing a driver nut onto the rotary tool output shaft, slipping the attachment onto the rotary shaft output shaft and rotating a mounting sleeve to tighten the same in place.

Another detailed object of the present invention is to provide such an improved attachment which incorporates a superior coupling design for coupling the output shaft of the hand tool to the input shaft of the attachment which is axially aligned with the rotary hand tool output shaft. The coupling incorporates a flexible shaft that is inserted into a driver nut having a unique interior configuration which easily accepts the flexible shaft and which effectively couples the rotary tool output shaft and attachment input shaft in a non-slipping rotational drive relationship.

A corollary object lies in the provision of the flexible shaft being adapted to compensate for any minor misalignment of the rotary tool output shaft and the input shaft of the attachment which could otherwise cause vibration and noise were it not for the flexibility and design of the flexible shaft and its connection to the input shaft of the attachment.

Still another object of the present invention is to provide such an improved right angle attachment which can be angularly positioned relative to the rotary tool itself throughout a complete 360° arc in increments that are relatively small. A corollary object is to provide such angular orientation capability that can be very simply achieved by merely loosening the mounting coupling, sliding the attachment off of the rotary tool, angularly reorienting it and sliding the attachment back onto the tool and retightening the mounting sleeve.

Another detailed object lies in the provision for using a driver nut (which is screwed onto the rotary tool output shaft) that has a relatively large number of internal grooves which cooperate with a square end portion of the flexible shaft that is inserted therein so that the right angle attachment can be easily attached to the rotary tool by sliding the attachment onto the rotary tool which simultaneously results in the flexible shaft being inserted into the driver nut without requiring any rotation of one or the other of the tool output shaft or the attachment output shaft.

Accordingly, the present invention provides an attachment for a power hand tool of the rotational type which has an output drive shaft and a tool case suspending the output drive shaft. The attachment includes a housing, a gear assembly having a flexible input shaft, an output shaft and a transmission between the flexible input shaft and the output shaft, the housing being configured for containing the flexible input shaft, and the transmission. A mounting coupling assembly includes an adaptor fixable to either one of the tool case or the housing, the adaptor having an opening through which the input shaft or the output drive shaft may pass for connection of the input shaft with the output drive shaft, and a mounting sleeve having a central opening for passing of the flexible input shaft or the output drive shaft and being configured for securing the adaptor to the corresponding other one of the housing or the tool case for attaching the attachment to the power hand tool.

In another embodiment, an attachment is provided for a rotary power hand tool which has an output drive shaft. The attachment includes a gear assembly having a flexible input shaft, an output shaft, a transmission between the input shaft and the output shaft, the flexible input shaft having a first end connectable to the output drive shaft, a hollow transmission input shaft at least partly containing the flexible input shaft and being in a fixed rotational coupling with the flexible input shaft adjacent to a second end of the input shaft, and a transmission gear being fixed to the hollow transmission shaft for transmission of rotational energy from the hollow shaft to the output shaft.

Other objects and advantages will become apparent upon reading the following detailed description, while referring to the attached drawings, in which:

FIG. 1 is an exploded perspective view of a portion of a right angle attachment embodying the present invention, the drawing excluding the mounting coupling assembly that is used for securing the portion shown in the drawing of FIG. 1 to a rotary hand tool;

FIG. 2 is a perspective view of a driver nut that is used with the attachment of the present invention, the driver nut being screwed onto the output shaft of the rotary hand tool to which the attachment is attached;

FIG. 3 is an enlarged left end view of the driver nut shown in FIG. 2;

FIG. 4 is a sectional perspective view of the right angle attachment embodying the present invention;

FIG. 5 is a plan view of the flexible shaft that is used in the present invention;

FIG. 6 is a sectional view of a portion of a rotary hand tool to which the attachment of the present invention is attachable; and, FIG. 7 is a sectional view of the transmission input shaft of the right angle attachment embodying the present invention.

DETAILED DESCRIPTION

Broadly stated, the present invention is directed to an attachment, and preferably a right angle attachment that is configured to be attached to a small electrically powered rotary hand tool of the type that is used in woodworking, hobby work and the like, the attachment being small, lightweight, relatively vibration free and quiet in operation, and easily attached to a hand tool in a very short amount of time without the use of any special tools. The attachment has a flexible input shaft and an output shaft that are oriented at an angular orientation, such as approximately 90° relative to one another, with the flexible input shaft being coupled to the hand tool to compensate for misalignment between the input shaft and the output drive shaft of the tool.

The attachment is easily attached to the hand tool by merely removing the chuck that is a part of the original hand tool and screwing the chuck to the attachment output shaft, screwing a driver nut on the rotary tool output drive shaft, screwing a mounting coupling assembly onto a threaded end of the rotary tool case, fitting the attachment to the hand tool by merely sliding it into engagement and tightening the mounting coupling assembly by hand. The attachment has a fluted interior that cooperates wit a complementary fluted exterior on the adaptor so that the angular position of the attachment relative to the tool can be changed in small increments throughout a complete revolution. This enables a user to position the output shaft of the attachment to virtually any desired angular position relative to the hand tool. While the number of flutes can be varied, there are preferably 12 flutes in the preferred embodiment, which enables the angular position to be changed in 30° increments.

Turning now to the drawings, and particularly FIG. 1, the attachment indicated generally at 10 includes a housing including components 12 and 14 in which a gear assembly, indicated generally at 16, is placed. The gear assembly 16 includes a pair of spiral bevel gears 18 and 20 which engage one another and translate the rotational movement at right angles, with the gear 20 being connected to an output shaft 22. The output shaft 22 is connected to a transmission output shaft 23 to which the gear 20 is actually attached, and which rides in spaced bearings 24 and 26, preferably ball or roller bearings so that shaft gear can easily rotate, with the outer portion of the bearing being held in suitable recesses 27 in the housing components 12 and 14. The gear assembly 16 also has a hollow transmission input shaft 28 (also referred to as the hollow shaft) to which the gear 18 is attached, and also includes a flexible input shaft 30 (also referred to as the flexible shaft) that is located in the hollow shaft 28 is attached to it at its end 31 (see FIG. 7) beyond the end of the gear 18. A pair of spaced bearings 32 and 34 are provided which permit easy rotation of the gear 18, shafts 28 and 30. The gears 18, 20 and the shafts 23 and 28, are collectively referred to as the transmission.

An important feature of the present invention is that the hollow transmission input shaft 28 is secured or fixed within the housing 12, 14 on the bearings 32,24 to accommodate high speed rotation, which is initiated by the flexible shaft 30, which is not fixed relative to the housing, and is not supported by bearings.

While in the preferred embodiment, the shafts 23 and 28 are oriented at generally a right angle to each other, it will be appreciated that the use of the flexible shaft 30 within a hollow shaft 28 may be used in other angular orientations and still provide the features of reduced misalignment. Also, the use of the present flexible shaft drive system may be employed in other types of attachments for power hand tools.

Referring to FIG. 4, which illustrates another perspective view of the attachment 10, it shows a mounting coupling assembly, indicated generally at 36, which is adapted to be screwed onto an electrically powered rotary hand tool 38, a portion of which is shown in the cross-sectional view of FIG. 6. The hand tool 38 is preferably of the type which has a cord that is plugged into a source of AC power, but the present invention can be used with any rotary hand tool that may be powered with a battery pack or other source of electrical power. The hand tool 38 has a threaded end portion 40 of its case or tool case 41 which may normally have a threaded end cap attached to it which has been removed and the hand tool 38 also has a threaded output drive shaft 42 on which a chuck 44 is typically provided. It should be understood that the chuck 44 may be secured to the output drive shaft 42 in other known ways besides threaded engagement.

In FIG. 6, the chuck 44 has been removed from the shaft 42 and applied to the output shaft 22 of the attachment 10 as shown in FIG. 4. The chuck 44 has a collet 46 and collet nut 48 of conventional design. It should be apparent that it is preferred that the output shaft 42 be of the same diameter as the output shaft 22 of the attachment 10 so that the same chuck 44 can be removed from the rotary hand tool and applied to the attachment by simply unscrewing from one and screwing it onto the other.

The mounting coupling assembly 36 includes an adaptor 50 that has internal threads 52 that are configured to engage threads 40 of the hand tool 38. However, it is contemplated that other engagement configurations, such as bayonet type or the like may also be employed to secured the adaptor 50 onto the case 41. It is also contemplated that the adaptor 50 may be dimensioned to engage the housing 12, 14, depending on the application.

In the preferred embodiment, the adaptor 50 is screwed onto the hand tool 38 until it is tight and secure. The adaptor 50 as an internal opening 54 that is larger than the diameter of the output drive shaft 42 of the hand tool, with the spacing between the outside diameter of the shaft 42 and the inside diameter 54 of the adaptor 50 being sufficient to enable a driver nut 56 to be screwed or otherwise attached onto the shaft 42 without interference with the adaptor 50 itself. The adaptor 50 also has a outwardly extending annular flange 58 which is adapted to engage an interiorly or radially inwardly directed collar portion 62 of a mounting sleeve 60, preferably taking the form of a finger nut, when the sleeve 60 is tightened during attachment to the tool 38. The mounting sleeve 60 has interior threads 64 for engaging a threaded portion 66 formed by the housing components 12 and 14 of the attachment. It should be understood that the mounting coupling assembly 36 can be reversed so that the adaptor 50 is secured to the housing 12, 14, and the mounting sleeve 60 may be engageable on the tool case 41, depending on the application.

In accordance with an important aspect of the present invention, the inside surface of the housing components 12 and 14 contains a plurality of axially directed splines 68 that extend around the complete circumference. The adaptor 50 has a cylindrical end portion 70 which has an outside surface that contains the same number of complementary splines 71, and these splines are adapted to engage the splines 68 of the attachment 10. While there may be a greater or lesser number of splines, the preferred embodiment has 12 splines 68 and 71 which permit the attachment 10 to be positioned in 12 different angular positions in 30° intervals relative to the rotary tool.

This feature permits the user to position the angle of the attachment 10 relative to the rotary tool 38 for optimum personal preference for the task being performed. Another advantage of this splined engagement feature is that the user always knows before attachment the angular orientation of the output shaft 22 relative to the axis of the rotary tool 38. This means that the attachment will not rotate axially relative to the tool axis during assembly, which could potentially interfere with the ergonomics of the attachment relative to the controls of the tool 38. It should be understood that while the complementary splined configuration of the adaptor 50 and housing components 12 and 14 have been shown and described, other complementary structural configurations can be used to mount the attachment 10 at various angular positions relative to the rotary tool 38.

In accordance with another important aspect of the present invention, the flexible input shaft 30 shown in FIGS. 1, 4 and 5 is generally circular, except that the ends 72 and 74 are square. The flexible shaft 30 is of conventional design and includes a core of wire plus four opposed layers of concentrically wrapped wire. The core is preferably approximately ⅛ inch in diameter. The end portions are preferably squared by a cold swaging process and the flexible shaft is approximately an inch long and is preferably model No. 130-21 manufactured by the Suhner Company of Rome, Ga.

An important feature of the present attachment 10 is that the flexible input shaft 30 has a diameter which is less than a bore 29 defined by the hollow transmission input shaft 28, and thus can flex to a certain degree within the bore. Since the flexible input shaft 30 fits within the hollow input shaft 28 and extends beyond the end thereof, the fact that the flexible shaft can flex with in the hollow shaft allows for the use of a longer flexible shaft to better accommodate misalignment between the output drive shaft 42 and the hollow shaft 28 while allowing for a shorter profile of the attachment 10.

Since the flexible shaft 30 has an outer diameter slightly less than the inside diameter of the input shaft 28, it is free to flex during operation and is therefore able to compensate for any structural misalignment between the attachment and the rotary tool 38. The ability of the shaft 30 to flex reduces the need for exceedingly close manufacturing tolerances and is important in reducing vibration and noise during operation.

An exposed or protruding end of the flexible shaft 30 is insertable into the driver nut 56 (FIG. 4) when the attachment is applied to the rotary tool 38. The flexible shaft 30 is attached to the hollow transmission input shaft 28 at the end thereof by a swaging or crimping of the end 31 of the shaft 28, which is just beyond the gear 18.

One or both of the end portions of the flexible shaft 30 may have a beveled portion as shown in the right end 74 in FIG. 5 to remove the sharp 90 degree corners to further facilitate insertion of the flexible shaft into the driver nut during installation of the attachment 10 or into end 31 of the input shaft during the manufacturing process. The bevel may have an approximately 45 degree angle as shown or it may be a greater or lesser angle or even curved. The surface can be formed by swaging, grinding or cutting as desired.

In accordance with yet another important aspect of the present invention, the driver nut 56 shown in FIGS. 2 and 3 has a hexagonal outer configuration so that a wrench can be used to apply it to or remove it from the output shaft 42. The driver nut has a hollow interior 76 that is provided with a threaded surface and is sized so that the driver nut 56 can be screwed onto the output shaft 42. Again, other attachment technologies besides threaded engagement are contemplated. The right end portion 78 has an opening 80 that is smaller than the threaded interior 76 and thereby forms an interior annular shelf 82 at the right end portion 78 that engages the outer end of the output shaft 42 when the nut 56 is tightened on the output shaft. The opening 80 also has an interior grooved configuration that preferably contains 8 symmetrically located grooves 84 This 8 point groove configuration is used to provide easier insertion of the square end 74 of the flexible shaft 30 into the driver nut 56 when the attachment is mounted to the rotary hand tool 38. It should be understood that a 4 point grooved configuration could be used, but with a configuration, the square ended shaft would have to be more accurately aligned to enable insertion of the flexible shaft 30.

It has been found that with the 8 point grooved configuration, only a maximum of 45 degree in angular adjustment is required to permit insertion, rather than a possible 90 degree adjustment for a 4 point configuration, and as a practical matter, insertion by the flexible shaft 30 into the 8 point configured driver nut is easily accomplished without any appreciable difficulty. It should also be understood that the preferred embodiment employs a square ended flexible shaft configuration and an 8 groove opening in the driver nut 56, the flexible shaft could have a multi-sided configuration that is other than square, i.e., it could be triangular or even pentagonal. The spirit of the invention would encompass a number of grooves that is larger than the number of sides of the multi-sided end of the flexible shaft.

From the foregoing, it should be appreciated that an improved right angle attachment has been shown and described which has many desirable advantages and attributes. The attachment is small and compact, and is capable of being easily attached to a rotary hand tool without the need for special tools. Moreover, it is quiet during operation and does not exhibit undesirable vibration that is often experienced from other prior art designs. The attachment also has the advantage that it can be attached to a rotary hand tool at any one of a plurality of angular positions so that a user can utilize the optimum angular position for any given task if desired. It should also be understood that while the driver nut, finger nut assembly, adjustable angular adjustability and flexible shaft design are shown and described with respect to the right angle attachment, the invention is not limited to a right angle attachment and can be used with other conceivable hand tool applications where the design considerations in coupling axially aligned rotatable shafts are similar, such as surgical and other instruments, for example.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An attachment for a rotary power hand tool which has an output drive shaft and a tool case suspending the output drive shaft, said attachment comprising:
   a housing;
   a gear assembly comprising a flexible input shaft; an output shaft and a transmission between said flexible input shaft and said output shaft, said housing being configured for containing said flexible input shaft, and said transmission;
   a mounting coupling assembly comprising an adaptor fixable to either one of the tool case or said housing, said adaptor having an opening through which said input shaft or said output drive shaft may pass for connection of said input shaft with said output drive shaft, and a mounting sleeve having a central opening for passing of said flexible input shaft or said output drive shaft and being configured for securing said adaptor to the corresponding other one of said housing or the tool case for attaching the attachment to the power hand tool;
   said adaptor of said mounting coupler assembly has a first end portion which is threaded to engage an end portion of the rotary hand tool case, the adaptor having a central opening through which the rotary hand tool output shaft may pass, said mounting sleeve having an interiorly threaded side portion for engaging a threaded end portion of said housing when said attachment is threaded onto the rotary hand tool.

2. The attachment as defined in claim 1 further including a driver nut configured for attachment to the output drive shaft of the rotary hand tool and having an opening in the end thereof that contains a plurality of grooves, the opening being adapted to receive said flexible input shaft when said attachment is installed on the rotary hand tool.

3. The attachment as defined in claim 1 wherein the output drive shaft is threaded, and further including a driver nut configured to be threadably attached to the output drive shaft.

4. The attachment as defined in claim 1 wherein said transmission includes a pair of gears operatively connected to a transmission input shaft which is engaged with said flexible input shaft and said output shaft, said gears engaging one another for rotating said output shaft in response to rotation of said input shaft.

5. The attachment as defined in claim 4 wherein said transmission input shaft is elongated and hollow and has one of said gears attached to a first end portion thereof, said flexible input shaft being elongated and having a smaller diameter than the inside of said hollow transmission input shaft, said flexible input shaft being located in said hollow transmission input shaft and being connected thereto at said first end portion thereof, the opposite end of said flexible input shaft extending beyond the end of sail transmission input shaft.

6. The attachment as defined in claim 5 further including a driver nut configured for attachment to the output drive shaft of the rotary hand tool and having an opening in the end thereof that contains a plurality of grooves, the opening being adapted to receive said flexible shaft when said attachment is installed on the rotary hand tool, and wherein said flexible input shaft has a multi-sided end portion configured for insertion into said opening of said driver nut when said attachment is installed on the rotary hand tool.

7. The attachment as defined in claim 6 wherein said multi-sided end portion of said flexible shaft is square.

8. The attachment as defined in claim 6 wherein said driver nut comprises:
   a generally cylindrical body with a hollow interior extending from one end to the opposite end portion;
   said hollow interior having a threaded interior surface adapted to engage the threaded output shaft so that the driver nut can be attached to the output shaft;
   said opposite end portion having an opening that is smaller than the diameter of said hollow interior to thereby form an interior annular shelf;
   said opening having a plurality of axially oriented symmetrically arranged grooves for receiving the multi-sided flexible shaft end portion, the number of grooves being greater than the number of sides of the flexible shaft end portion.

9. The attachment as defined in claim 8 wherein the end portion of the input shaft is square and said number of grooves is eight.

10. The attachment as defined in claim 1 wherein said adaptor has a radially projecting flange, and said sleeve is threaded for engaging said housing and has a radially inwardly projecting collar dimensioned to engage said flange so that as said sleeve is threadably secured to said housing, said housing is engaged onto the tool case.

11. The attachment as defined in claim 1 wherein said adaptor includes a second end portion opposite said first end portion, said second end portion having an outer surface configuration that comprises a first plurality of axially aligned splines extending around the complete periphery thereof, said housing having a threaded exterior end portion and an interior surface opposite said threaded exterior end portion, said interior surface having a second plurality of axially aligned complementary splines extending around the complete periphery thereof, said first and second pluralities of splines being engagable in a plurality of angular positions relative to one another.

12. The attachment as defined in claim 11 wherein said plurality of splines comprises 12 splines, said attachment being capable of being angularly adjustable relative to the rotary hand tool through 360 degrees in 30 degree intervals.

13. The attachment as defined in claim 1 wherein said housing has a right angled configuration and said transmission is configured to transmit rotation of said flexible input shaft at right angles to said output shaft, which is oriented at a right angle to said flexible input shaft.

14. An attachment for a rotary power hand tool which has an output drive shaft, said attachment comprising:
   a gear assembly having a flexible input shaft, an output shaft, a transmission between said input shaft and said output shaft, said flexible input shaft having a first end connectable to the output drive shaft, a hollow transmission shaft at least partly containing said flexible input shaft and being in a fixed rotational coupling with said flexible input shaft adjacent to a second end of said input shaft, and a transmission gear being fixed to said hollow transmission shaft for transmission of rotational energy from said hollow shaft to said output shaft; and said hollow shaft has a central bore dimensioned to accommodate said flexible input shaft, said flexible input shaft having a cross section, and said bore having a diameter which is greater than said cross section to permit said flexible input shaft to flex within said bore to accommodate differences in alignment between said transmission input shaft and the output drive shaft of the tool.

15. The attachment as defined in claim 14 further including a housing configured for containing said gear assembly, and at least one bearing for securing said hollow transmission shaft in said housing for rotation relative thereto, said rotation being initiated by said flexible input shaft.

16. An attachment for a rotary power hand tool which has an output drive shaft and a tool case suspending the output drive shaft, said attachment comprising:

a housing;

a gear assembly comprising a flexible input shaft; an output shaft and a transmission between said flexible input shaft and said output shaft, said housing being configured for containing said flexible input shaft, and said transmission;

a mounting coupling assembly comprising an adaptor fixable to either one of the tool case or said housing, said adaptor having an opening through which said input shaft or said output drive shaft may pass for connection of said input shaft with said output drive shaft, and a mounting sleeve having a central opening for passing of said flexible input shaft or said output drive shaft and being configured for securing said adaptor to the corresponding other one of said housing or the tool case for attaching the attachment to the power hand tool;

said transmission includes a pair of gears operatively connected to a transmission input shaft which is engaged with said flexible input shaft and said output shaft, said gears engaging one another for rotating said output shaft in response to rotation of said input shaft; and said transmission input shaft is elongated and hollow and has one of said gears attached to a first end portion thereof, said flexible input shaft being elongated and having a smaller diameter than the inside of said hollow transmission input shaft, said flexible input shaft being located in said hollow transmission input shaft and being connected thereto at said first end portion thereof, the opposite end of said flexible input shaft extending beyond the end of said transmission input shaft.

* * * * *